US006279052B1

(12) United States Patent
Upadrastra

(10) Patent No.: US 6,279,052 B1
(45) Date of Patent: Aug. 21, 2001

(54) DYNAMIC SIZING OF FIFOS AND PACKETS IN HIGH SPEED SERIAL BUS APPLICATIONS

(75) Inventor: Prasad V. Upadrastra, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/006,511

(22) Filed: Jan. 13, 1998

(51) Int. Cl.$^7$ ........................................... G06F 13/00
(52) U.S. Cl. ................................. 710/22; 709/232
(58) Field of Search .................... 709/232–235; 710/22–30, 55–57

(56) References Cited

U.S. PATENT DOCUMENTS

| | | | | |
|---|---|---|---|---|
| 4,603,382 | * | 7/1986 | Cole et al. | 364/200 |
| 4,677,616 | * | 6/1987 | Franklin | 370/94 |
| 5,303,347 | * | 4/1994 | Gagne et al. | 395/250 |
| 5,412,781 | * | 5/1995 | Lukas et al. | 395/250 |
| 5,524,214 | * | 6/1996 | Kurihara | 395/250 |
| 5,541,919 | * | 7/1996 | Young et al. | 370/61 |
| 5,548,786 | * | 8/1996 | Amini et al. | 395/842 |
| 5,696,940 | * | 12/1997 | Liu et al. | 395/481 |
| 5,784,698 | * | 7/1998 | Brady et al. | 711/171 |
| 5,797,043 | * | 8/1998 | Lewis et al. | 395/876 |
| 5,828,837 | * | 10/1998 | Eikeland | 395/200.32 |
| 5,838,944 | * | 11/1998 | Kipp et al. | 395/394 |
| 5,892,980 | * | 4/1999 | Tal et al. | 395/876 |

* cited by examiner

Primary Examiner—David A Wiley
(74) Attorney, Agent, or Firm—Blakely, Sokoloff, Taylor & Zafman LLP

(57) ABSTRACT

An apparatus for conducting serial bus transactions. The embodiments of the invention permit a reduction in the die space allocated to buffering in chipsets supporting a high speed serial bus. Buffering currently occupies a substantial proportion of total die area. That proportion is expected to increase as the serial protocols implemented gain speed. Accordingly, control of buffers sizes is expected to provide a significant cost benefit both now and in the future. In one embodiment, a transceiver is provided. A plurality of FIFOs are allocatable from a shared buffer pool, each FIFO corresponding to a serial bus transaction type. A plurality of direct memory access controllers (DMAs) are coupled to the FIFO and fill or empty the FIFO. A link layer provides an interface between the transceiver and the FIFOs permitting the transceiver to conduct transactions to and from the FIFOs. In another embodiment of the invention, again a transceiver is provided. A FIFO smaller than a default packet size of an associated transaction type is employed. A link layer provides an interface between the small FIFO and the transceiver. The link layer also sets a control register to dictate packet size so that an upstream system can handle transfers of the packet size eventhough constrained by the small FIFO.

10 Claims, 4 Drawing Sheets

US 6,279,052 B1

DYNAMIC SIZING OF FIFOS AND PACKETS IN HIGH SPEED SERIAL BUS APPLICATIONS

BACKGROUND OF THE INVENTION (1) Field of the Invention

The invention relates to data transfer. More specifically, the invention relates to transfers of data between a host system and a serial bus.

(2) Related Art

The existing systems provide for transmission of data across high speed serial buses. One existing protocol for serial data transmission is defined in IEEE Std. 1394-1995, IEEE Standard for a High Performance Serial Bus published Aug. 30, 1996. Revisions to this standard can be expected from time to time. Two such revisions are 1394a Draft Standard for a High Performance Serial Bus (Supplement) and 1394b Draft Standard for a High Performance Serial Bus (Supplement) (1394a and 1394b respectively). These protocols are generically referred to herein as "1394" protocols. Similarly, systems implementing these protocols are generically "1394" systems. An analogous labeling convention is employed throughout.

In the 1394 protocols as with most serial protocols, the data to be sent is packetized in a host system and a layer of buffering is provided between the memory and any transport layer to store the packets awaiting transfer and/or packets received waiting to be forwarded to the memory of the host system. FIG. 1 is a block diagram of a prior art system employing a static buffer layer. In this system a processor 1 is coupled via a memory controller 4 to a memory 3. The memory controller 4 is also coupled to a graphics card 5. The chipset 2 includes the memory controller 4, an arbitration unit 6 coupled to the memory controller, and a plurality of direct memory access controllers (DMA) 11 coupled to the arbitration unit 6. TheS DMA load or empty a plurality of FIFOs which provide buffering for packets received from or to be sent to the serial bus 18. A link layer 16 provides the interface between the FIFOs and a transceiver 17. The transceiver 17 couples to serial bus 18 and transmits and receives packets across serial bus 18.

For outgoing transactions, a driver 10 which executes on processor 1 packetizes the data from memory and transfers the packet into the appropriate transfer FIFO via DMA controllers 11, in this case FIFO 12 for asynchronous transfers and FIFO 14 for isochronous transfers. This requirement that the packets be created and stored requires a certain buffer size at least equal to the packet size. Thus, employing this prior art technique the options for reducing chipset die size going forward appear quite limited. FIG. 4 is a diagram of a prior art packet. The packets contain a packet header, a header cyclic redundancy check value (CRC), data, and a data CRC. The packet header and the CRCs contribute a fixed overhead existing regardless of the amount of data packetized.

The 1394 protocols support a four transaction types i) asynchronous transmits, ii) asynchronous receives iii) isochronous transmits and iv) isochronous receives. Each of these transaction types has an associated FIFO of static size in which the size is selected at manufacture based on an optimal packet size for the 1394 protocol implemented. In the case of 1394a, which operates with speeds of up 400 megabits per second, the size of each transaction FIFO is two kilobytes. As speeds increase with subsequent generations of 1394 protocol, the size of the optimal buffers will increase proportionally. Significantly, the buffers represent a large proportion of the die area required to create the chipset. Increases in buffer size will further increase both die size and the proportion of the die area allocated to buffer area. This increase in real estate required is expected to significantly increased cost of the chipsets.

Accordingly, it would be desirable to have a method and apparatus which would employ total buffering smaller than use of optimal packet sized buffers for each transaction type, without loss of functionality. In this way, the area required to create the chipset could be reduced with a corresponding reduction in cost.

BRIEF SUMMARY OF THE INVENTION

An apparatus for conducting serial bus transactions is disclosed. In one embodiment, a transceiver is provided. A plurality of FIFOs are allocatable from a shared buffer pool, each FIFO corresponding to a serial bus transaction type. A plurality of direct memory access controllers (DMAs) are coupled to the FIFOs and fill or empty the FIFOs. A link layer provides an interface between the transceiver and the FIFOs permitting the transceiver to conduct transactions to and from the FIFOs.

In another embodiment of the invention, again a transceiver is provided. A FIFO smaller than a default packet size of an associated transaction type is employed. A link layer provides an interface between the small FIFO and the transceiver. The link layer also sets a control register to dictate packet size so that an upstream system can handle transfers of the packet size eventhough constrained by the small FIFO.

DETAILED DESCRIPTION OF THE INVENTION

The embodiments of the invention permit a reduction in the die space allocated to buffering in chipsets supporting a high speed serial bus. Buffering currently occupies a substantial proportion of total die area. That proportion is expected to increase as the serial protocols implemented gain speed. Accordingly, control of buffer sizes is expected to provide a significant cost benefit both now and in the future.

Figure 1:
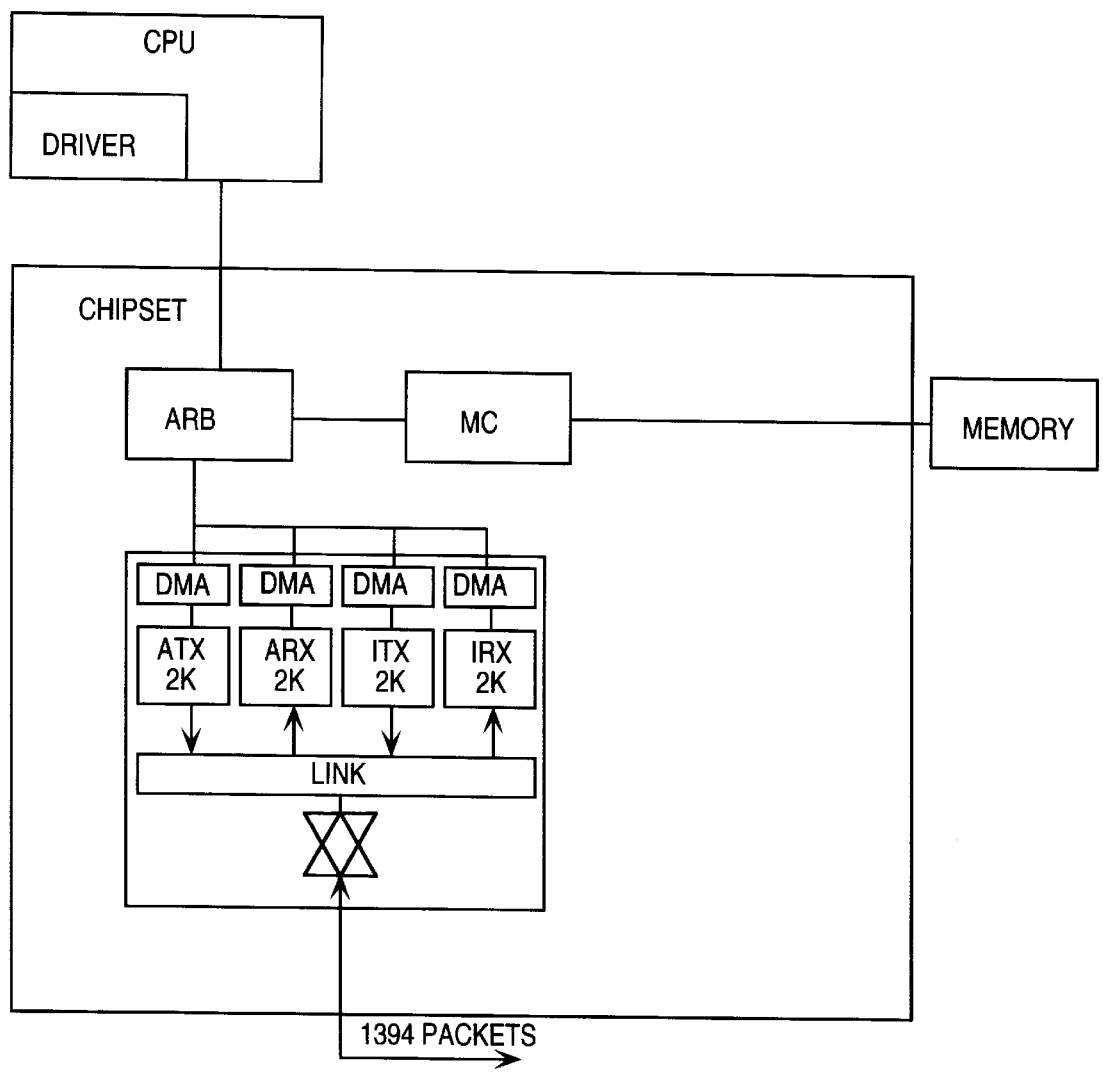
FIG. 1 is a block diagram of a prior art system employing a static buffer layer.
Figure 2:
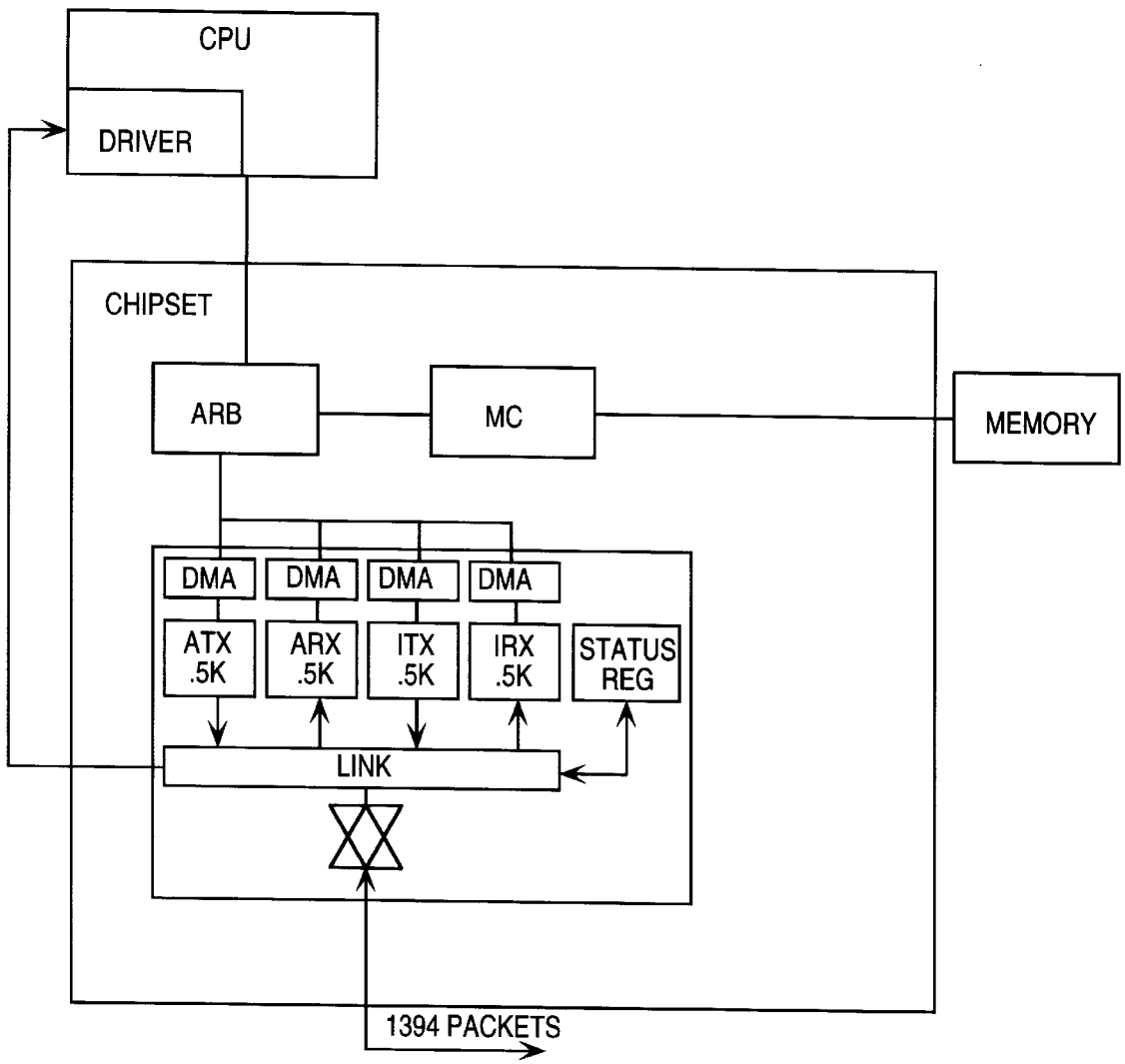
FIG. 2 is a block diagram of a system employing one embodiment of the invention.

FIG. 2 is a block diagram of a system employing one embodiment of the invention. A processor 1 is provided and has a driver 40 executing thereon. Processor 1 is coupled to a memory controller 44 which resides within chipset 42. The memory controller 44 in turn is coupled to memory 3, graphics card 5, and arbitration unit 6. Arbitration unit 6 is coupled to a plurality of direct memory access controllers (DMAs) 11. The DMAs 11 are coupled to FIFOs corresponding to asynchronous transmit 52, asynchronous receive 53, isochronous transmit 54, and isochronous receive 55. Each of these FIFOs 52–55 communicate via the link layer 56 with the transceiver 17. Transceiver 17 is the physical interface that transmits or receives serial packets across serial bus 18. A buffer pool 50 is provided and is the source of the FIFOs. The driver 40 dynamically allocates the buffer pool 50 amongst the four transaction FIFOs 52–55. In one embodiment, a plurality of control registers 62–65 are provided, one corresponding to each of the transaction types. The driver 40 stores an indication of the FIFO size to be used for a corresponding transaction FIFO in each corresponding control register. Allocation of the buffer pool 50 amongst the FIFOs can then be accomplished by pointer manipulation. In an alternate embodiment, the control register 62–65 contain actual pointers into the buffer pool 50 indicating the start and/or end of the respective FIFO for the corresponding transaction type.

Because there will not be transactions of all types being conducted simultaneously, this dynamic allocation of the buffer pool 50 permits an overall reduction in the die size required for the chipset. For example, instead of having total FIFOs of 8 k as in the prior art, a 5 k buffer pool might be used and appropriately allocated to the FIFOs of the transaction types likely to occur. Accordingly, the driver 40 is aware of the bandwidth available and the bandwidth required by each existing application for each transaction type. The driver 40 assigns the FIFOs based on the applications existing on processor 1, which are likely to seek access to serial bus 18. This permits reduction in size of the total buffering on the chip, and therefore, a reduction of die size, while maintaining the service level possible under the old implementation.

Figure 3:
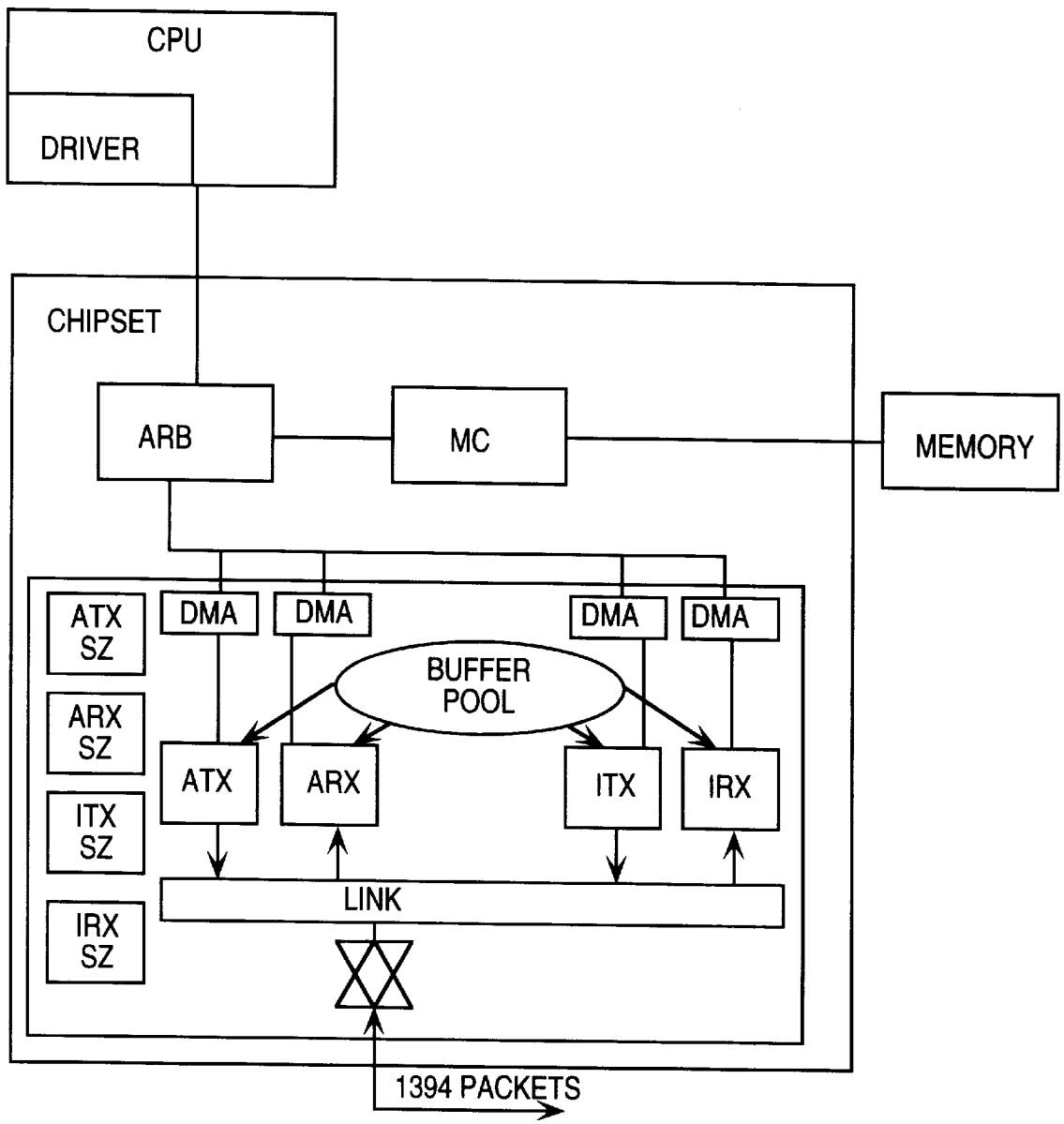
FIG. 3 is a block diagram of an alternative embodiment of the invention.
Figure 4:
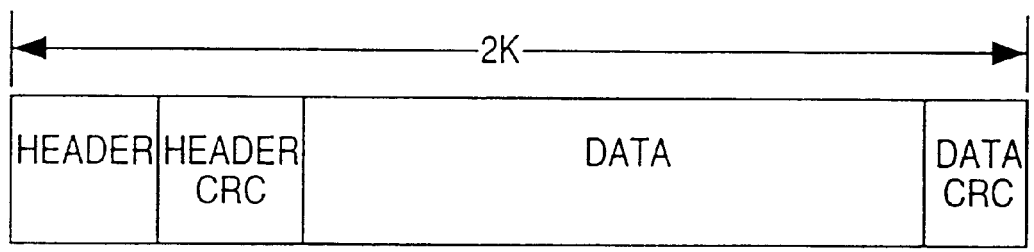
FIG. 4 is a diagram of a prior art packet.

FIG. 3 is a block diagram of an alternative embodiment of the invention. A processor 1 has a driver 140 executing thereon. Processor 1 is coupled to a memory controller 144 which resides within chipset 142. Memory controller 144 is coupled to graphics card 5, memory 3, and arbitration unit 6. Arbitration unit 6 is coupled to a plurality of DMA's 11 which are coupled to an asynchronous transmit FIFO 152, an asynchronous receive FIFO 153, an isochronous transmit FIFO 154 and an isochronous receive FIFO 155. A link layer 156 interfaces between the FIFO's 152–155 and transceiver 17. Transceiver 17 in turn transmits and receives packets over serial bus 18.

In one embodiment, each of the FIFOs 152–155 is 512 bytes long. Because mall FIFOs are used that will generally be smaller than an optimal packet, the prior art technique of packetizing and storing the entire packet before transmission will not work. This embodiment operates on the premise that the DMAs and the upstream subsystem is able to supply data or remove data faster than the data can be transmitted by or received from the serial bus 18.

For example, for outgoing transactions the DMAs will fill e.g. asynchronous transmit FIFO 154 until it reaches some threshold value. Once the threshold is surpassed link layer 156 will instigate a transmission via transceiver 17. Because the upstream subsystem responsible for filling the FIFO is generally much faster than the transmission over the serial bus 18, the small FIFO can be filled real time until the end of packet is reached. Unfortunately, there will be times when resource collisions in the upstream subsystem cause the link layer 156 to exhaust the data in the FIFO prior to reaching an end of packet. In this case, the link layer sends an interrupt 126 to driver 140 and sets status register 125. An error will also be generated on the serial bus 18 and the recipient of that partial packet will discard it.

The status register holds an indication of packet size and in the course of normal operation will generally be set to the optimal size for the transaction type and speed of the serial protocol. However, when the link layer exhausts the data (for a transmit) or FIFO space (for a receive) without reaching an end of packet, the link layer 156 sets status register 125 to indicate a packet size less than the optimum packet size but which will still provide a minimum level of service. Smaller packets reduce throughput and use the serial bus 18 less efficiently. However, by reducing the packet size to a size which can be accommodated in a real time manner, smaller FIFOs can be employed and some level of service can be maintained. It is also within the scope and contemplation of the invention to have a status register 125 for each FIFO 152–155 so that packet size can be varied between transaction types.

It is expected that resource scarcity in the upstream subsystem will be relatively rare. Accordingly, the link layer will periodically increase the packet size to improve efficiency by resetting the status register 125 to step up the packet size. Prior to preparing a next packet, the driver will read the status register 125 to determine the packet size. In one embodiment, the link layer may increment from 512 bytes to 1 KB and then to 1.5 B and then to 2 KB (presuming 2 KB is the optimum packet size). Other embodiments may have more or fewer steps and different end points.

As one example, an eyeball camera doing video conferencing may seek to send 160 megabits per second of high quality video. This may for example, necessitate a 2 KB packet size. However, if the resource scarcity in the filling or emptying upstream subsystem necessitates reduction of packet size to 512 bytes packet size, 40 megabits per second could still be provided. Thus, while resolution of the video conferencing would be reduced and/or possibly size of the video image, no frames would be lost and some quality of service would be maintained.

Figure 5:
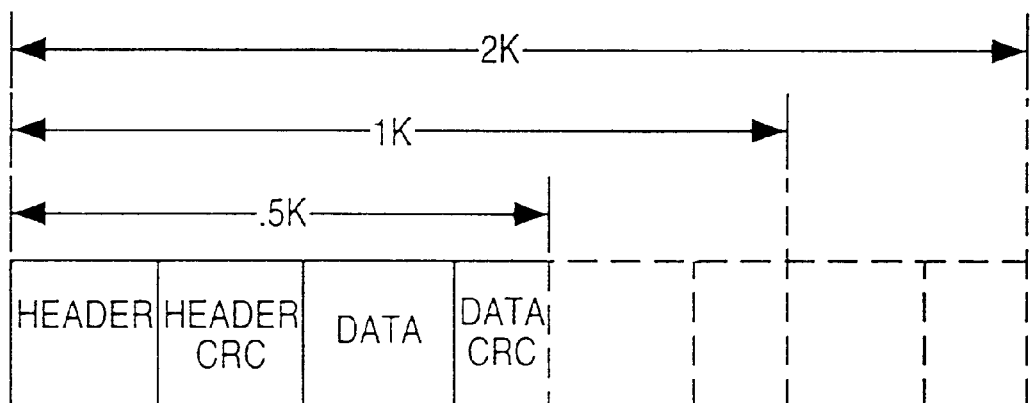
FIG. 5 shows an example of a variable size packet of one embodiment of the invention.

FIG. 5 shows an example of a variable size packet of one embodiment of the invention. As with prior art packets, each packet contains a packet header CRC and a data header CRC. The size of the data block in each packet varies with the size of the packet relative to the fixed overhead of each packet. Thus, the more data that can be sent for a given increment of overhead the more efficient the use of the bus. Moreover, when several devices try to gain access to a serial bus simultaneously, any particular device may only have an opportunity to transmit on the bus periodically, e.g. every fourth packet opportunity. Thus, the more data that can be sent during each packet opportunity the more efficient the use of the bus. Nevertheless, being able to reduce the packet size may permit a device to take advantage of a packet opportunity to at least transmit some data whereas if the packet size were not reduced no valid data would be transmitted. Thus, the dynamically sizable packet is a significant benefit. Moreover, as discussed above it permits significant reduction of the size of FIFOs allocated to each transaction type. This will significantly reduce the die size required to implement a chipset.

It is also within the scope and contemplation of the invention to combine dynamically sized FIFOs from a buffer pool with a dynamic packet sizing. As this will better enable a system to insure quality of service without excessive real estate allocated to buffering. Typically, the size of FIFO allocated will be the smallest packet size which will provide some quality of service for the devices expected to use that transaction type. Thus, if two devices are likely to use the asynchronous receive transaction type one which would have quality of service at 512 bytes and the other which would have quality of service at 1 k, the asynchronous receive FIFO would be allocated as 1 k at least when the device requiring 1 k was seeking to use the FIFO. In one embodiment the driver notifies the link layer of the minimum packet size for which quality of service can be maintained. In such embodiment, the link layer will insure that the status register is not set below that minimum packet size. In another embodiment, the driver resets the packet size in the status register to the minimum size responsive to the interrupt from the link layer. In addition to dynamic reallocation of the buffer pool among FIFOs, the threshold value at which transmission/retrieval begins might be dynamically changed, and such is within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
   a transceiver;
   a buffer pool dynamically allocatable between FIFOs for a plurality of transaction types;
   a plurality of DMA controllers to fill and empty the FIFOs and coupled to the FIFOs allocated from the buffer pool; and
   a link layer interfacing between the FIFOs and the transceiver such that the transceiver can conduct serial bus transactions to and from the FIFOs.

2. The apparatus of claim 1 further comprising:
   a plurality of control registers coupled to the buffer pool setable to define a size of the FIFOs for each transaction type.

3. A system comprising:
   a serial bus;
   a processor;
   a serial bus driver executing on the processor, the driver packetizing data to be transferred over the serial bus wherein a packet size is dynamically setable within an acceptable service range;
   a memory controller coupled to the processor and a memory;
   a plurality of direct memory access controllers (DMA's) coupled to the memory controller and a plurality of FIFOs, each FIFO of the plurality corresponding to a serial bus transaction type and having a size smaller than a default packet size of a corresponding transaction type;
   a transceiver to transmit and receive packets across a serial bus; and
   a link layer interfacing between the FIFOs and the transceiver.

4. The system of claim 3 wherein the FIFOs are dynamically allocatable from a shared buffer pool.

5. The system of claim 3 wherein the link layer reduces the packet size when resource scarcity in an upstream subsystem prevents real time handling of packets of an optimum size.

6. The system of claim 5 wherein the link layer interrupts the driver when the speed of the upstream subsystem fails to exceed the speed of transfers on the serial bus.

7. An apparatus comprising:
   a transceiver;
   a FIFO smaller than a default packet size of an associated transaction type;
   a link layer interfacing between the FIFOs and the transceiver such that the transceiver can conduct serial bus transactions to and from the FIFOs; and
   a control register setable by the link layer to dictate a packet size wherein the packet size is reduced if an upstream system cannot handle transfers at the existing packet size.

8. The apparatus of claim 7 wherein transfer of a packet begins before the packet is received entirely by the FIFO.

9. The apparatus of claim 7 wherein the link layer signals a downstream subsystem to discard a packet if the link layer exhausts data in the FIFO without reaching an end of the packet.

10. The apparatus of claim 7 wherein the link layer interrupts the driver when the speed of the upstream subsystem fails to exceed the speed of transfers on the serial bus.

* * * * *

UNITED STATES PATENT AND TRADEMARK OFFICE
CERTIFICATE OF CORRECTION

PATENT NO. : 6,279,052 B1
DATED : August 21, 2001
INVENTOR(S) : Upadrastra

It is certified that error appears in the above-identified patent and that said Letters Patent is hereby corrected as shown below:

<u>Column 1,</u>
Line 37, delete "TheS", and insert -- The --.

Signed and Sealed this

Eleventh Day of June, 2002

Attest:

Attesting Officer

JAMES E. ROGAN
*Director of the United States Patent and Trademark Office*